May 8, 1945.    C. J. CALBICK    2,375,280
MANOMETER CIRCUITS
Filed March 2, 1943     2 Sheets-Sheet 1

INVENTOR
C. J. CALBICK
BY Hugh S. Wertz
ATTORNEY

May 8, 1945.   C. J. CALBICK   2,375,280
MANOMETER CIRCUITS
Filed March 2, 1943   2 Sheets-Sheet 2

INVENTOR
C. J. CALBICK
BY
Hugh S. Wertz
ATTORNEY

Patented May 8, 1945

2,375,280

UNITED STATES PATENT OFFICE 2,375,280

MANOMETER CIRCUITS

Chester J. Calbick, Chatham, N. J., assignor to Bell Telephone Laboratories, Incorporated, New York, N. Y., a corporation of New York Application March 2, 1943, Serial No. 477,710

1 Claim. (Cl. 250—27)

This invention relates to electric circuits and more specifically to circuits for indicating gas pressures in electron discharge devices.

Electric circuits for measuring gas pressures in cathode ray and other electronic devices are well known. One such circuit, called for convenience a manometer circuit, is disclosed in Patent 2,217,198 issued October 8, 1940, to C. J. Davisson and embodies a three-element tube, the envelope of which is supplied with gas at the pressure to be measured. In the manometer circuit disclosed in the Davisson patent, the plate of the tube is made negative and the grid positive with respect to the filament and for constant grid (electron) current, the plate (positive ion) current is measured to indicate the pressure. This direct current manometer circuit, however, has the disadvantage that it becomes inaccurate if the leakage current is high. The leakage current becomes relatively high when there is a lowering of the resistance between electrode elements, as for example, when (due to continuous operation of the manometer tube as a pump for the cathode ray tube) metallic portions of the cathode are evaporated and coated on the insulation between the electrode elements (particularly between the grid and the plate). The presence of such a high leakage current causes the measurement of pressure to be inaccurate as the percentage changes in the grid and plate currents due to leakage are not generally equal. In arrangements disclosed in Patent 1,592,364 issued July 13, 1926, to W. G. Houskeeper, the effect of low leakage resistance (which would tend to produce high leakage current) between a pair of electrode elements in a three-element electron discharge device is eliminated by applying only an alternating voltage between the two elements. The leakage current is thus alternating in character and will not be indicated by direct current meters connected in circuit with the two elements.

It is an object of this invention to provide means for improving the operation of circuits of the type disclosed in the above-mentioned Houskeeper patent for measuring gas pressure.

In the circuit arrangements hereinafter described, which are basically similar to those of the above-mentioned patent to Houskeeper, an alternating voltage is applied between the grid (an electron receiving member) and the plate (a positive ion receiving member) of an electron discharge device containing gas whose pressure is to be measured, a direct current source of less voltage than that of the alternating source being used to bias the plate negative with respect to the filament (an electron emitting member). Direct current meters are used in the plate and grid circuits and as the leakage current between grid and plate (usually it is largest between these two elements) is alternating, the meters (through both of which this alternating leakage current passes) do not indicate it. The ratio of plate (positive ion) to grid (electron) current is used to obtain the pressure in a manner which will be described hereinafter.

The tube geometry, that is, the arrangement of the various electrode elements and of the mounting and supporting members therefor, is usually such that the leakage current between grid and plate is far greater than that between filament and plate. Moreover, the leakage current between filament and grid (though it may be as large as that between grid and plate) is usually small in comparison with the much larger electron current between these elements and this discharge current does not pass through the meter connected to the plate. Thus in nearly all cases the harmful effects of the leakage current can be substantially avoided by applying an alternating voltage between the grid and the plate. However, it will be appreciated that tubes of special design can be built in which the major electrical leak is between the filament and the plate or between the filament and the grid. If either of these two latter situations exists, the alternating voltage is applied between those two electrode elements between which the major leak occurs. In all cases, the plate is maintained at a negative direct potential with respect to the cathode. The invention will be described in detail below in connection with the case wherein the major electrical leak takes place between the grid and the plate.

The specific features of novelty of this invention will be more readily understood by referring to the following description taken in connection with the accompanying drawings forming a part thereof in which:

Fig. 1 discloses a three-element tube of a conventional type which can be utilized in the manometer circuit of this invention;

Figure 1:
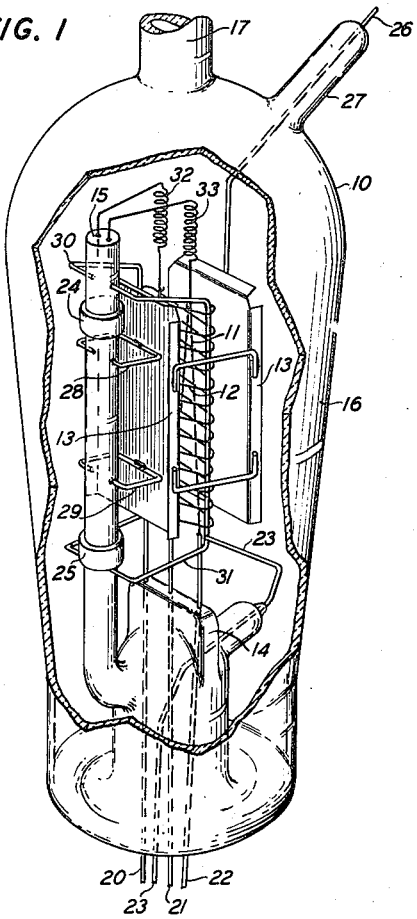
Figure 2:
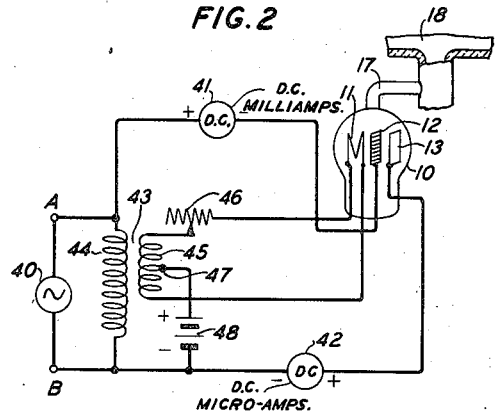
Fig. 2 is a schematic circuit diagram of an alternating current manometer circuit.

Referring more specifically to the drawings, Fig. 2 shows an alternating current manometer circuit for measuring gas pressures in an electron discharge device such as, for example, a cathode ray tube. The circuit comprises a conventional three-electrode thermionic tube 10 (see Fig. 1) comprising a filament 11, a grid 12, a plate 13, a supporting stem 14, a supporting rod or arbor 15 attached to the stem 14, and an envelope 16 enclosing these elements. The envelope is connected by a neck 17 to the device or envelope 18 containing the gas whose pressure is to be measured. Such a device can be, for example, a cathode ray device, a portion of which is indicated in Fig. 2.

The electron discharge device 10 shown in Fig. 1 and a direct current manometer circuit including it are illustrated and described in detail in an article entitled "A new design of an ionization manometer" by E. K. Jaycox and H. W. Weinhart published in the Review of Scientific Instruments, volume 2, pages 401 to 411, July 1931. A brief description of the tube 10 is, however, given here so that the invention can be more readily understood. The filament or cathode 11 is mounted in the shape of an M with three connections 20, 21 and 22 fastened to it, one at each end and one at the center. These connections pass through the press 14. Where the device is to be used to measure the gas pressure in a sealed-off vacuum tube to which it is attached, the filament can be made of thoriated tungsten wire. Where it is to be used to measure the gas pressure on the pumps, a rather heavy oxide-coated filament can be used so that it will stand up better under the rather violent treatment it is sometimes subjected to while in such use. Preferably, however, the filament is made of tantalum which, as described in the C. J. Davisson patent above identified, acts as a getter material to reduce the gas pressure, thus causing the electronic device 10 to act as a pump as well as a measuring device. The grid member 12 is preferably of nickel and serves as an anode and its function is to collect electrons emitted from the cathode. A connection 23 passing through the press 14 is connected to the grid 12. Although the anode (grid) is quite close to the cathode, the length of the ionizing path of the electrons is appreciable since the emitted electrons gyrate about the thin wires of the anode before being collected upon it. The positive ion collector 13 consists of two electrically connected parallel nickel plates, one on either side of the filament-grid structure. The positive ion collector (plate) 13 is maintained at a negative potential with respect to the cathode by means which will be described more fully below. To insure good insulation for the positive ion collector 13, loose fitting glass collars 24 and 25 are placed on the glass arbor 15. These prevent the deposition of a continuous film of conducting material on the arbor 15. The connection 26 to the positive ion collector 13 is brought out through a separate ear 27 of the glass bulb 10. The plates 13 are supported from the arbor 15 by means of supporting wires 28 and 29; the grid 12 is supported from the arbor 15 by means of the support wires 30 and 31; and the filament 11 is supported from this arbor 15 by means of small tension springs 32 and 33.

Referring again to Fig. 2, an alternating voltage, of for example, 110 volts, from a suitable source 40, is applied between the grid 12 and the ion collector member (plate) 13. A direct current milliammeter 41 is connected in the lead to the grid while a direct current microammeter 42 is connected in the connection to the ion collector 13. By means of a transformer 43 having a primary winding 44 and a secondary winding 45 an alternating potential of reduced intensity (for example, 5 to 10 volts) is applied between the terminals of the filament 11 through a variable resistor 46. An inner terminal 47 of the secondary winding is connected through a source of direct potential 48 to the plate 13 through the meter 42. If desired, however, one of the outer terminals of the winding 45 can be connected to the source 48, the satisfactory operation of the device not being dependent on the exact circuit arrangement shown in Fig. 2. The source 48 is so poled that the positive terminal thereof is connected to the inner terminal 47 of the transformer winding 45 while the negative terminal of the source is connected through the meter 42 to the member 13.

Before describing in detail the method of operation of the circuit arrangement shown in Fig. 2, a brief description of the manner in which gas pressures can be calculated by measurements of positive ion and electron currents will be given. It has been verified repeatedly by a number of investigators, and again in experiments conducted with the circuit of the present invention, that for pressures below $10^{-4}$ millimeters of mercury, the positive ion current is almost directly proportional to the pressure of the gas and to the magnitude of the electron current flowing from cathode to grid at any given value of grid potential. Thus, the pressure of the gas in the manometer may be expressed as follows:

$$p = C\, i_p/i_e \qquad (1)$$

where $i_p$ and $i_e$ represents the positive ion and electron currents respectively, and $C$ is a constant whose value depends upon the geometry of the particular tube and the potential of its grid, and also upon the nature of the gas therein. In practice the exact composition of the gas is not usually known but the constants for residual gases ordinarily found in vacuum tubes do not differ by more than a factor of two. For any given gas pressure it is desirable that the positive ion current be as large as possible for convenience in measurement.

In the direct current manometer circuit described in the Davisson patent and also in the one described in the above-mentioned Jaycox-Weinhart article, inaccuracies result when the direct current leakage between any two electrodes is large as the leakage current does not bear the same ratio to the positive ion current as it does to the electron current. Due to evaporation of the cathode as, for example, when a tantalum filament is used, metallic portions of the cathode are coated on the insulation between electrode elements such as, for example, on the arbor 15 between the support wires 30 for the grid and the support wires 28 for the plate or between the support wires 29 for the plate and the support wires 31 for the grid despite the action of the collars 24 and 25 which are loosely mounted on the arbor 15 and which tend to reduce the leakage resistance between these support wires by discouraging the formation of continuous conducting films on the arbor. The leakage resistance between the filament and the plate is usually much higher (perhaps 100 times or more) because the glass path between the lead-in wires for the filament and plate is much longer within the tube. The leakage resistance between the filament and the grid is of substantially the same order of magnitude as the leakage resistance between the grid and the plate but usually does not cause any trouble because the electron current between the grid 12 and cathode 11 is so much larger (for example, from 100 to 100,000 times larger) than the positive ion flow to the plate 13 that the leakage current between the filament and the grid does not introduce any appreciable error in the calculated gas pressure, this leakage current not passing through the meter connected to indicate the ion current. At low gas pressures, the leakage current (particularly between the grid and the plate) introduces a serious distortion in the reading of the meter 42 indicating the positive ion current because this current is low for very low gas pressure. In accordance with the present invention, the effect of this leakage current is substantially removed by applying an alternating potential between the grid 12 and the positive ion collecting member or plate 13 by means of a source 40. The plate 13 is maintained at all times at a negative potential with respect to the filament 11 by means of the source 48 which has a potential which is less than that of the source 40 and which may be, for example, 22½ volts. When the terminal A of the source 40 is positive with respect to the terminal B thereof by 110 volts, for example, the grid 12 is positive with respect to the plate 13 and with respect to the cathode 11, the plate 13 being negative with respect to the cathode 11 by reason of the source 48. Electrons are caused to be emitted from the cathode 11 to the grid 12 which electrons ionize the gas within the envelope 10 which is at the same pressure as the gas in the electron discharge device 18, which may be, for example, a cathode ray tube of the type disclosed in the Davisson patent mentioned above. In addition to the electron and the positive ion current there is (1) an alternating leakage current between the filament and the grid (which is usually so small in comparison with the electron current between these two electrode elements that it can be neglected), (2) a direct leakage current between the filament and the plate (which because of the high direct resistance—frequently of the order of 10,000 megohms or more—between these two electrode elements is very small), and (3) an alternating leakage current between the grid 12 and the plate 13 which, especially for very low gas pressures, is appreciable. Now, when the terminal B is positive with respect to the terminal A, the plate 13 is positive with respect to the grid 12 but negative with respect to the filament 11. The grid 12 is also negative with respect to the filament 11. There will therefore be no electron space current and no ion current. There is, however, the same leakage currents as in the case when the terminal A is positive with respect to the terminal B but the directions of flow of the first and third of these leakage currents are respectively opposite to those present under the first-mentioned condition.

Figure 5:
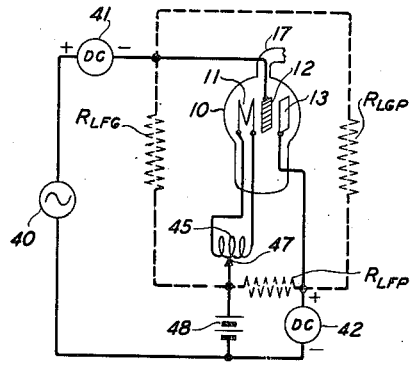
Figs. 5 and 6 are diagrammatic and graphical representations to aid in explaining the invention.
Figure 6:
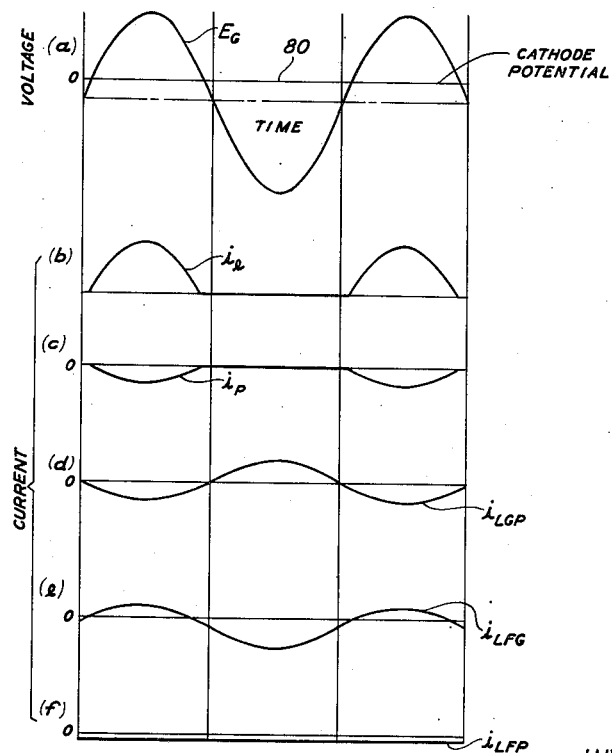

Reference will now be made to Figs. 5 and 6 which are diagrammatic and graphical representations serving to make more clear the operation of the present manometer circuit arrangement. Fig. 5 is a simplification of the circuit arrangement of Fig. 2 showing schematically the leakage resistances $R_{LFG}$ (between filament and grid), $R_{LGP}$ (between grid and plate), and $R_{LFP}$ (between filament and plate). In a tube of the type shown in Fig. 1, these resistances may have, for example, the following values: $R_{LFG}$, 1 to 1,000 megohms; $R_{LGP}$, 1 to 10,000 megohms; and $R_{LFP}$, 100 to 100,000 megohms. Fig. 6 shows various waves of voltage and current plotted against time in which no attempt has been made to draw the various ordinates of Fig. 6 to the same scale. Fig. 6(a) represents a portion of the voltage wave between the grid 12 and the filament 11. This voltage is designated $E_G$. It will be noted that because of the source 48 more of the wave $E_G$ is negative with respect to the cathode potential, which is indicated by the line 80 in Fig. 6(a), than is positive with respect to this potential. Fig. 6(b) represents the electron space current $i_e$ from the filament 11 to the grid 12. In general, there is no electron space current to the grid when it is negative with respect to the cathode as the plate 13 is negative. Fig. 6(c) represents the ion current $i_p$. In practice, $i_p$ is of the order of 100 to 100,000 times less than $i_e$. Fig. 6(d) represents the leakage current $i_{LGP}$ between the grid and the plate. This is a sine wave which passes through both meters 41 and 42. If this were a direct current it would increase the reading of both meters when they are hooked up in the manner indicated in Fig. 5. As this is an alternating wave, however, and the meters 41 and 42 are of the direct current type, $i_{LGP}$ does not form part of the current indicated by the meters. Fig. 6(e) represents the leakage current $i_{LFG}$ between the filament and the grid. It will be noted that the larger part of the wave is negative due to the direct current source 48. Thus there is a direct leakage component which prevents the meter 41 from giving a true reading of the electron space current $i_e$. This leakage current, not being a space current, gives rise to no ion current and will not affect the reading of the meter 42. As this direct component is of the order of one thousandth, or less, of the average $i_e$, it can usually be neglected. For more accurate work, $R_{LFG}$ can be measured and as the indication of the meter 41 is usually kept constant during a series of pressure readings, the true $i_e$ can be readily computed. The alternating component of $i_{LFG}$, of course, does not affect the direct current meter 41. Fig. 6(f) represents the leakage current $i_{LFP}$ between the filament and the plate. This is a direct current which adds to the average value of $i_p$ and thus, if the meter 42 were accurate enough, tends to distort the reading of that meter. However, due to the fact that $R_{LFP}$ is usually so large, $i_{LFP}$ becomes so small that it can be neglected. Moreover, it is constant, so that the error can be calculated and, if large enough, can be used to calibrate the meter 42. None of $i_{LFP}$ passes through the meter 41.

In summation, it can be stated that as a practical matter, the only leakage current which can introduce serious distortions in the ratio $i_e/i_p$ when direct potentials only are applied between the electrode elements has been made alternating and thus rendered incapable of causing such distortions. It should perhaps be mentioned for the sake of clarity that leakage current still flows in the manometer circuit, but, being alternating, it causes no deflection of the indicators of the direct current meters.

If, by reason of unusual tube geometry, the leakage resistance between the filament and the plate is unusually low, an alternating voltage only can be applied between the filament and the plate instead of between the grid and the plate as in Fig. 2. The grid is biased negatively with respect to the filament so an alternating voltage as well as a direct voltage is applied between filament and grid. The leakage current in the plate lead of this arrangement will be alternating and will not be indicated in the direct current meter in the plate lead. Moreover, if by reason of unusual tube geometry the leakage resistance between the filament and grid is unusually low (it would have to be very low in order to be of serious consequence due to the fact that electron current is relatively high compared with the ion current) an alternating potential only can be applied between the filament and the grid. The plate in this latter circuit is biased negatively with respect to the filament. Inasmuch as in this last-mentioned arrangement all of the leakage current between the filament and the grid would then be alternating, it would not be indicated by the meter in the grid lead. It can thus be stated as a generality that if it is desired to obtain a current reading free of leakage current between two electrode elements, an alternating voltage and only an alternating voltage is applied between these two elements.

As a specific example of operation of the circuit of Fig. 2, consider that the constant C of Equation 1 has a value of about 0.1. Then if $i_e$ is equal to $20 \times 10^{-3}$, $$\frac{C}{i_e} = 5$$

and the pressure $p$ is equal to $5 \times i_p$. A reading of $i_p$ of 1 microampere would mean a pressure $p$ of $5 \times 10^{-6}$ millimeters of mercury. Similarly, if $i_e$ is equal to $10 \times 10^{-3}$ amperes, a reading of 1 microampere means a pressure of $1 \times 10^{-5}$ millimeters of mercury.

Figure 3:
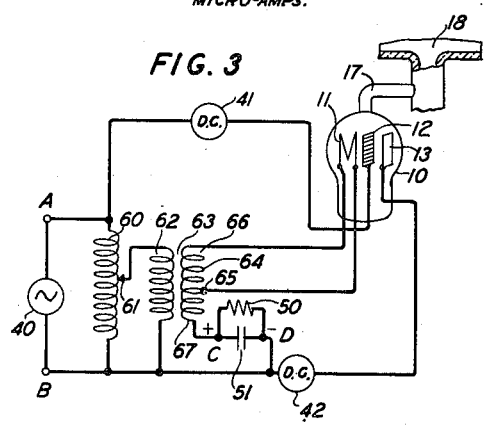
Figs. 3 and 4 are variations of the circuit shown in Fig. 2.

The circuit arrangement of Fig. 3 is a modification of the circuit of Fig. 2, the main difference being that the source 48 of Fig. 2 is replaced by a resistor 50 shunted by condenser 51 to provide self bias for the plate 13 with respect to the cathode 11. In Fig. 3, moreover, the transformer 43 of Fig. 2 is replaced by a magnetic coil 60, one terminal of which is connected through the meter 41 to the grid 12 while its other terminal is connected through the meter 42 to the plate 13. An inner terminal 61 of the coil 60 is connected to the primary winding 62 of a transformer 63, the secondary winding 64 of which is so wound that the upper terminal becomes positive when the terminal A of the source 40 is positive with respect to the terminal B thereof. This upper terminal 66 and an inner terminal 65 of the winding 64 are connected to the filamentary cathode 11, while the lower terminal 67 of the winding 64 is connected through the resistance 50 and the condenser 51 in parallel thereto and through the direct current meter 42 to the plate 13. By means of this arrangement when the terminal A of the source 40 becomes positive with respect to the terminal B, the grid 12 becomes positive with respect to the filament 11 and an electron current flows to the grid 12 from the cathode 11. This causes the terminal C of the resistance 50 to become positive with respect to the terminal D of this resistance. As no current flows from the grid to the cathode when the potentials of the terminals A and B are reversed, the potential across the condenser 51 tends to remain substantially constant as the time constant of the circuit including the resistor 50 and condenser 51 is relatively long compared with the period of the waves from the source 40. Thus substantially the equivalent of the source of constant potential 48 is provided. The operation of the circuit in Fig. 3 is otherwise the same as that described above in connection with Fig. 2.

Figure 4:
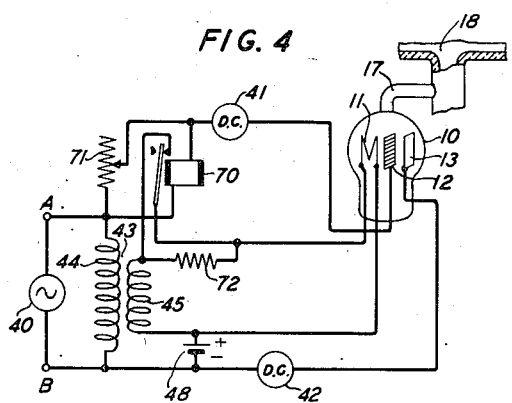

Fig. 4 shows another modification of the circuit shown in Fig. 2. The circuit of Fig. 4 includes a relay 70 operated by the grid current of the tube 10. The windings of the relay 70 are connected between the terminal A of the source 40 and the direct current meter 41, a variable resistance 71 being connected across the coil of the relay 70. The contacts of the relay 70 are connected in a series circuit including the secondary winding 45 of the transformer 43 and the filamentary cathode 11. A resistance 72 is connected across the contacts. When the terminal A is positive with respect to the terminal B the grid 12 becomes positive with respect to the filament 11 and grid current flows through the winding of the relay 70. The contacts of the relay 70 remain normally closed through both halves of each cycle provided the average grid current does not exceed a certain predetermined value but when the average grid current exceeds this value these contacts open. This value can be changed by adjusting the rheostat 71 in parallel with the relay coil. Thus the average grid current can be maintained constant at some assigned value and it is unnecessary to have a resistance, such as the member 46 in the circuit arrangement of Fig. 2, to control the temperature of the filament 11. The resistance 72 across the relay contacts provides for smoother operation of the circuit as this causes the filament current to be reduced not to zero but merely to some lower value. The operation of the circuit of Fig. 4 is otherwise similar to that in Fig. 2. The source 48 has been shown connected to the lower terminal of the secondary winding 45 of the transformer 43 instead of to an inner terminal as in Fig. 2. It is obvious that either arrangement is operative.

The self-biasing arrangement of Fig. 3 and the relay control arrangement of Fig. 4 can be applied to circuits wherein an alternating voltage only is applied between the filament and the grid or between the filament and the plate, as well as to a circuit as in Figs. 3 and 4 wherein an alternating voltage only is applied between the grid and the plate.

What is claimed is:

In combination, an envelope containing gas and enclosing an electron emitting member, an electron receiving member, and a positive ion collecting member, means for applying an alternating voltage between said electron emitting and receiving members, and means for maintaining the ion collecting member at a substantially constant negative potential with respect to said electron emitting member, whereby there is set up a pulsating electron space current between said electron emitting and receiving members and a pulsating positive ion flow to said ion collecting member, said means for maintaining said ion collecting member at a constant negative potential with respect to said electron emitting member comprising a resistance member with a capacity member shunted thereacross connected in circuit between the electron emitting member and said ion collecting member.

CHESTER J. CALBICK.